United States Patent [19]
Jansen et al.

[11] Patent Number: 5,866,705
[45] Date of Patent: Feb. 2, 1999

[54] POLYMERIC SILABOROCARBOAZANES, A PROCESS FOR THEIR PREPARATION AND THEIR USE

[75] Inventors: Martin Jansen, Bonn; Hardy Jüngermann, Werl, both of Germany

[73] Assignee: Bayer Aktiengesellschaft, Leverkusen, Germany

[21] Appl. No.: 891,610

[22] Filed: Jul. 11, 1997

Related U.S. Application Data

[63] Continuation-in-part of Ser. No. 891,933, Jul. 9, 1997.

[30] Foreign Application Priority Data

Jul. 15, 1996 [DE] Germany ................ 196 28 448.1

[51] Int. Cl.⁶ .................. C07F 5/02; C07F 7/08
[52] U.S. Cl. ............ 556/402; 550/403; 501/96.1; 501/96.3; 501/96.5; 106/286.8; 106/287.11; 427/228; 427/397.7; 428/447; 428/704; 528/30
[58] Field of Search ............... 550/402, 403; 501/96.1, 96.3, 96.5; 106/286.8, 287.11; 428/447, 704; 427/228, 397.7; 528/30

[56] References Cited

U.S. PATENT DOCUMENTS

| | | | |
|---|---|---|---|
| 5,030,744 | 7/1991 | Funayama et al. | 556/402 |
| 5,045,399 | 9/1991 | Niebylski | 556/402 X |
| 5,118,774 | 6/1992 | Mignani et al. | 556/402 X |
| 5,162,558 | 11/1992 | Ardaud et al. | 556/402 |
| 5,233,066 | 8/1993 | Jansen et al. | 556/402 |
| 5,258,229 | 11/1993 | Lum et al. | 556/402 X |
| 5,312,942 | 5/1994 | Jansen et al. | 556/402 |
| 5,405,982 | 4/1995 | Loffelholz et al. | 556/402 X |

FOREIGN PATENT DOCUMENTS

| | | | |
|---|---|---|---|
| 0404503 | 12/1990 | European Pat. Off. | C04B 35/58 |
| 0424082 | 4/1991 | European Pat. Off. | C08G 77/60 |
| 0502399 | 9/1992 | European Pat. Off. | C01B 35/14 |
| 4241288 | 6/1994 | Germany | C08G 79/00 |
| 4447534 | 3/1996 | Germany . | |
| 19530390 | 2/1997 | Germany | C08G 77/60 |
| 19530404 | 2/1997 | Germany | C04B 35/571 |

*Primary Examiner*—Paul F. Shaver
*Attorney, Agent, or Firm*—Sprung Kramer Schaefer & Briscoe

[57] ABSTRACT

The present invention relates to new polymeric silaborocarboazanes, a process for their preparation and their use.

9 Claims, No Drawings

POLYMERIC SILABOROCARBOAZANES, A PROCESS FOR THEIR PREPARATION AND THEIR USE

This application is a continuation-in-part of application Ser. No. 08/891,933, filed Jul. 9, 1997, now pending.

The present invention relates to new polymeric silaborocarboazanes, a process for their preparation and their use.

The process for producing multielemental, non-oxidic ceramics via molecular single-component precursors has become extremely important. It enables access to nitridic and carbonitridic material systems which are not accessible via traditional solid reactions. The products are characterised by high purity, homogeneous distribution of elements and uniform particle sizes.

Materials which consist of Si, B and N, and possibly also C, exhibit particular properties with regard to thermal stability and resistance to oxidation. They may be used as bulk materials, but also for coatings and as fibrous materials. Boron-containing materials exhibit increased retardation of crystallisation, whereas carbon-containing ceramics also have higher decomposition points than carbon-free ceramics.

According to U.S. Pat. No. 5,233,066, synthesis of the amorphous ceramics $Si_3B_3N_7$ and $SiBN_3C$ from the precursor trichlorosilyl aminodichloroborane (TADB) proceeds by crosslinking with ammonia or amines and subsequent pyrolysis in a gas stream. The silicon borocarbonitride produced is characterised by outstanding ceramic properties.

In this method, the composition of the products is predetermined on the one hand by the single component precursor and on the other hand by the type of crosslinking. Whereas the Si:B ratio is set at 1:1 by the precursor, the N:C ratio depends on the choice of methylamine as the crosslinking reagent and its pyrolysis behaviour.

Carbon is incorporated into the ceramic via the organic side chains in the amine. This proceeds in an uncontrolled manner, however, via a currently unidentified reaction. The disadvantage of this procedure is the small variation in the concentration of carbon which is possible because lengthening the side chain does not necessarily lead to a higher proportion of carbon in the ceramic but instead to the deposition of graphite in the material, which has a deleterious effect on the properties. In addition, a large part of the carbon is lost during pyrolysis because the side chains are eliminated in the form of volatile alkanes, alkenes, etc.

The object of this invention is the provision of new types of polymeric silaborocarboazanes which are simple to prepare and can be prepared in high yields and from which ceramic materials or ceramic moulded items, films etc., can be produced in good yield. Carbonitridic ceramics which consist of only Si, B, N and C and which do not have the disadvantages mentioned above are intended to be produced by pyrolysis of these polymeric silaborocarboazanes.

The requirements are fulfilled by the following polymers, which are the object of this invention. These are polymeric silaborocarboazanes of the general structural formula

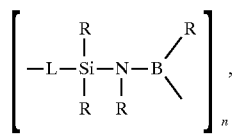

in which each Si atom is coordinated by two R and one L and each B-atom is coordinated by one R and one L while Si and B are connected via one NR, in which $L=C_xN_yH_z$ where $x \geq 1$, $y \geq 1$ and $z \geq 0$ and R, independently of each other, represents a $C_1$–$C_6$-alkyl, vinyl or phenyl or L group and n has a value greater than five.

In a preferred embodiment of the invention the $SiR_2(NR)$ BR-units of the polymeric silaborocarboazane build up chains or rings with the help of at least one L-bridging residue.

In a preferred embodiment, the elements are uniformly distributed in the polymeric silaborocarboazanes according to the invention. In a particularly preferred embodiment the distribution of elements is uniform down to at least a resolution of 0.5 μm.

The invention also provides a process for preparing the polymeric silaborocarboazanes according to the invention, where a borosilazane precursor of the formula

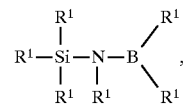

in which R', independently of each other, represents H, a halogen, a $C_1$–$C_6$-alkyl, vinyl, phenyl and/or —$NR^2_2$ group, where $R^2$ represents H, a $C_1$–$C_6$-alkyl, vinyl or phenyl group, is reacted with $C_xN_yH_z$ molecules which contain free NH— and/or CH— functions and in which $x \geq 1$, $y \geq 1$ and $z \geq 0$. $(Me_2N)_3Si$—NH—$B(NMe_2)_2$ (TABB) is preferably used as a borosilazane precursor.

The following are preferred as $C_xN_yH_z$ molecules which contain free NH— and/or CH— functions: formamidine, guanidine, aminoguanidine, diaminoguanidine, hydrazine, methylhydrazine, dimethylhydrazine, dicyanamide, triazole, melamine, aminoacetonitrile, aminotriazole, cyanoguanidine, diaminotriazole, acetamidine, methylguanidine, ethylenediamine, dinitriloaminomalonate, aminotriazines, acetylenes and/or propargylamines. The use of cyanamide, guanidine, formamidine and/or melamine is preferred.

In a preferred embodiment, the reaction is performed at temperatures between –80° C. and 200° C., preferably 20° C., either in bulk or in an aprotic organic solvent which may be a $C_5$–$C_8$-alkane, an acyclic or cyclic ether, an alkyl aromatic compound, such as e.g. toluene or pyridine, DMF or DMSO. Performing the reaction in an aprotic organic solvent is particularly preferred.

The number, and ratio in the mixture, of N—C—H compounds used may be selected to have any values at all so that any desired stoichiometry with respect to the elements C and N may be set for the product. The ratio of borosilazane precursor to $C_xN_yH_z$ molecules is preferably 1:2.5 to 1:10, in particular 1:5.

It is possible to control the degree of cross-linking and the molecular weights of polymers according to the invention via the concentration of N—C—H compounds. At low concentrations viscous oils are obtained, at high concentrations solids are produced.

To prepare powders, the solvent is removed with the excess crosslinking reagent and the polymer is dried under reduced pressure. Other commonly used drying procedures are also suitable.

The invention also provides use of the polymeric silaborocarboazanes according to the invention to produce ceramic materials by pyrolysis in inert atmospheres which contain nitrogen or noble gases at temperatures of 400° to 2000° C., preferably 1500° C.

In a preferred embodiment, the polymers are heated to a temperature between 100° and 600° C. and held at this temperature for several hours to synthesise ceramic powders. Then they are calcined at temperatures between 1200° and 1500° C. in a nitrogen or argon atmosphere to remove hydrogen.

The invention also provides use of the polymeric silaborocarboazanes according to the invention to produce ceramic moulded items, films, fibres or coatings by pyrolysis in an atmosphere which contains noble gas, nitrogen, ammonia or a primary amine at temperatures of 400° to 2000° C.

The choice of $C_xN_yH_z$ compound enables the properties of the polymeric silaborocarboazanes according to the invention to be controlled. Depending on the N—C—H compound, insoluble thermoset materials or soluble thermoplastic materials are produced which can be subjected to a variety of shaping processes directly in solution or as a melt; e.g. casting, spinning into fibres, thermoforming to produce films, the production of coatings by a variety of coating processes such as dip-coating or spin-coating.

The invention is explained by way of example in the following without this being regarded as any kind of restriction.

EXAMPLE 1
Preparing a Polyborosilazane Using Cyanamide
Reaction equation:

$(Me_2N)_3Si—NH—B(NMe_2)_2+H_2CN_2 \rightarrow [SiBN_xC_yH_z]+Me_2NH$ (TABB)

Experimental Method:

A solution of 2.1 g (0.05 mol) of cyanamide in 100 ml of THF was heated to boiling point. 2.7 g (0.01 mol) of TABB which had been dissolved in 10 ml of THF, were added dropwise to this. Boiling was then continued for a further one hour. The polymer precipitated as a white solid. The THF was removed with excess cyanamide and the precipitate was dried under reduced pressure for 5 hours at 160° C. Analytical data for the polymer:

| Infrared spectroscopy [cm$^{-1}$]: | 3340(s, b) | ν N—H |
| | 2193(m), 2151(m) | ν$_{as}$N=C=N |
| | 1639(s), 1556(s) | δ N—H |
| | 1498(w), 1436(w) | ν$_s$N=C=N |
| | 1323(w) | ν B—N |
| | 1067(m, b) | ν Si—N |
| | 553(m, b) | |

Powder diffractometry: amorphous
Energy dispersive X-ray analysis: homogeneous polymer.

1.028 g of the polymer were pyrolysed in a stream of nitrogen by heating to 200° C. at 5 K/min and after a 4 h retention time heating to 1500° C. at 5K/min with a 24 hour retention time. 0.218 g of a velvety-black, amorphous powder were obtained, corresponding to a ceramic yield of 21%.
Analytical data for the pyrolysis product:

| Infrared spectroscopy [cm$^{-1}$]: | 3443(w, vb) | OH— (from water) |
| | 1398(m, vb) | ν B—N |
| | 896(m, b) | ν Si—N |
| | 788(w), 753(w) | δ B—N |
| | 500(w) | |
| | 418(w) | δ Si—N |

Powder diffractometry: amorphous. Energy dispersive X-ray analysis: homogeneous distribution of elements at least down to the resolution limit of 0.5 μm. The pyrolysis product was in the form of spherical particles with diameters between 0.5 and 2 μm. Elemental analysis [wt.%]: Si 26.3; B 10.9; N 29.8; C 29.0; O 2.7.

EXAMPLE 2
Preparing a Polyborosilazane Using Cyanoguanidine
Reaction equation:

$(Me_2N)_3Si—NH—B(NMe_2)_2+H_2N—CNH—NH—CN \rightarrow [SiBN_x-C_yH_z]+Me_2NH$ (TABB)

Experimental method:

2 g (0.0073 mol) of TABB in 10 ml of dimethylethylene glycol ether were added dropwise, with stirring, to solution of 3.9 g (0.0041 mol) of cyanoguanidine in 400 ml of dimethylethylene glycol ether at room temperature. A white polymer was produced and this was filtered off and dried under reduced pressure. Analytical data for the polymer:

| Infrared spectroscopy [cm$^{-1}$]: | 3430(s, b) | ν N—H |
| | 2195 (m), 2161 (m) | ν CN |
| | 1641(m) | ν C=N |
| | 1560(m), 1498(w) | δ N—H |
| | 1321(w) | |
| | 1258(w) | ν C—N |
| | 1022(w, b) | ν Si—N |
| | 929(w) | ν Si—N |
| | 556(w) | |
| | 465(w, b) | δ Si—N |

Powder diffractometry: amorphous Energy dispersive X-ray analysis: homogeneous polymer.

234 mg of the polymer were heated to 300° C. at 5K/min in a stream of nitrogen and after a 4 h retention time were heated to 1500° C. at 5K/min. 50.6 mg of a grey pyrolysis product were obtained, corresponding to a ceramic yield of 21.6%.

EXAMPLE 3
Preparing a Polyborosilazane Using Formamidine
Reaction equation:

$(Me_2N)_3Si—NH—B(NMe_2)_2+H_2N—CH=NH \rightarrow [SiBN_xC_yH_z]+Me_2NH$ (TABB)

Experimental method:

6.7 g (0.083 mol) of formamidine hydrochloride were dissolved in 250 ml of dimethylsulphoxide and 5 ml of chloroform. 2.7 g (0.01 mol) of TABB were added rapidly and dropwise to this. During subsequent warming, an initially white and later pale brown precipitate was produced which was then filtered off and dried under vacuum at 200° C.

| Infrared spectroscopy [cm$^{-1}$]: | 3038(s, b) | ν NH |
| | 1710(s) | ν C=N |
| | 1645(m) | δ NH |
| | 1422(m) | |
| | 1358(m) | ν C—N |
| | 1151(w) | ν B—N |
| | 1064(w) | ν Si—N |
| | 731(w, b) | |
| | 610(w) | |

Powder diffractometry: amorphous Energy dispersive X-ray analysis: homogeneous polymer.

512 mg of the polymer were heated to 300° C. at 5K/min in a stream of nitrogen and after a 4 h retention time were heated to 1500° C. at 5K/min. 113 mg of a grey pyrolysis product were obtained, corresponding to a ceramic yield of 22%. Elemental analysis [wt.%]: Si 26.2; B 13.4; N 33.3; C 21.6; O 6.0.

EXAMPLE 4
Preparing a Polyborosilazane Using Melamine
Reaction equation:

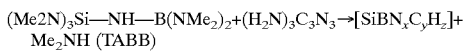
Me$_2$NH (TABB)

Experimental method:

5.3 g (0.042 mol) of melamine were dissolved in 250 ml of dimethylsulphoxide and 25 ml of dichloromethane. 2.7 g (0.01 mol) of TABB were added to this solution. The initially clear solution became cloudy when heated and a brown precipitate was produced which was filtered off and dried under vacuum at 200° C.

| Infrared spectroscopy [cm$^{-1}$]: | 3420(m) | ν N—H |
| --- | --- | --- |
| | 1568(s, b) | δ N—H |
| | 1345(s, b) | ν C—N |
| | 812(m) | δ C—N |
| | 467(w, b) | δ Si—N |

Powder diffractometry: amorphous Energy dispersive X-ray analysis: homogeneous polymer.

832 mg of the polymer were heated to 300° C. at 5K/min in a stream of nitrogen and after a 4 h retention time were heated to 1500° C. at 5K/min. 258 mg of a grey pyrolysis product were obtained, corresponding to a ceramic yield of 31%. Elemental analysis [wt.%]: Si 40.5; B 5.5; N 26.6; C 11.7; O 7.3.

EXAMPLE 5
Preparing a Polyborosilazane Using Guanidine
Reaction equation:

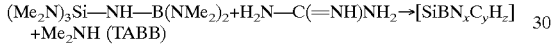
+Me$_2$NH (TABB)

Experimental method:

2.7 g of TABB in 10 ml of pyridine were added dropwise, over the course of 1 hour, to a solution of 4.8 g (0.05 mol) of guanidine hydrochloride in 300 ml of pyridine at boiling point. The reaction mixture was heated under reflux for a further 3 hours. A resinous solid was formed which was separated from the solvent by filtration. It was then dried under vacuum.

| Infrared spectroscopy [cm$^{-1}$]: | 3295(s, b) | ν N—H |
| --- | --- | --- |
| | 2771(m), 2440(w) | ν NH$_2^+$ |
| | 1648(s) | ν C=N |
| | 1439(m) | |
| | 1068(m) | ν Si—N |

Powder diffractometry: amorphous Energy dispersive X-ray analysis: homogeneous polymer.

223 mg of the polymer were heated to 300° C. at 5K/min in a stream of nitrogen and after a 4 h retention time were heated to 1500° C. at 5K/min. 46.3 mg of a black pyrolysis product were obtained, corresponding to a ceramic yield of 20.8%. Elemental analysis [wt.%]: Si 27.9; B 11.1; N 35.0; C 23.1; O 2.3.

We claim:

1. Polymeric silaborocarboazanes of the general structural formula

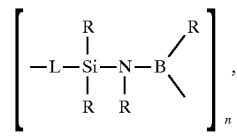

in which each Si atom is coordinated by two R and one L and each B-atom is coordinated by one R and one L while Si and B are connected via one NR—, in which L=C$_x$N$_y$H$_z$ where x≧1, y≧1 and z≧0 and R, independently of each other, represent a C$_1$–C$_6$-alkyl, vinyl, phenyl or L group and n has a value greater than five.

2. Polymeric silaborocarboazanes according to claim 1, characterised in that the elements are uniformly distributed.

3. Polymeric silaborocarboazanes according to one of claims 1 to 2, characterised in that the elemental distribution is uniform down to a resolution of 0.5 μm.

4. Process for preparing the polymeric silaborocarboazanes according to one or more of claims 1 to 3, characterised in that a borosilazane precursor of the formula

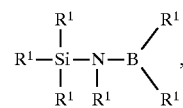

in which R', independently of each other, represents H, a halogen, a C$_1$–C$_6$-alkyl, vinyl, phenyl and/or —NR$^2{}_2$ group, where R$^2$ represents H, a C$_1$–C$_6$-alkyl, vinyl or phenyl group, is reacted with C$_x$N$_y$H$_z$ molecules which contain free NH— and/or CH— functions and in which x≧1, y≧1 and z≧0.

5. The process of claim 4, characterised in that (Me$_2$N)$_3$Si—NH—B(NMe$_2$)$_2$ is used as the borosilazane precursor.

6. Process according to claim 4, characterised in that cyanamide, guanidine, formamidine and/or melamine is used as the C$_x$N$_y$H$_z$ molecule with free NH— and/or CH— functions.

7. A ceramic prepared from the polymeric siloborocaroazane according to claim 1.

8. A ceramic as claimed in claim 7, prepared by pyrolysis of the polymeric siloborocaroazane in an inert atmosphere which contains nitrogen or noble gases at temperatures of 400° to 2000° C.

9. A molded item, film, fiber, or coating prepared from the ceramic of claim 7.

* * * * *